(No Model.)
H. S. SUTTON.
MUSICAL CHART.
No. 479,902. Patented Aug. 2, 1892.
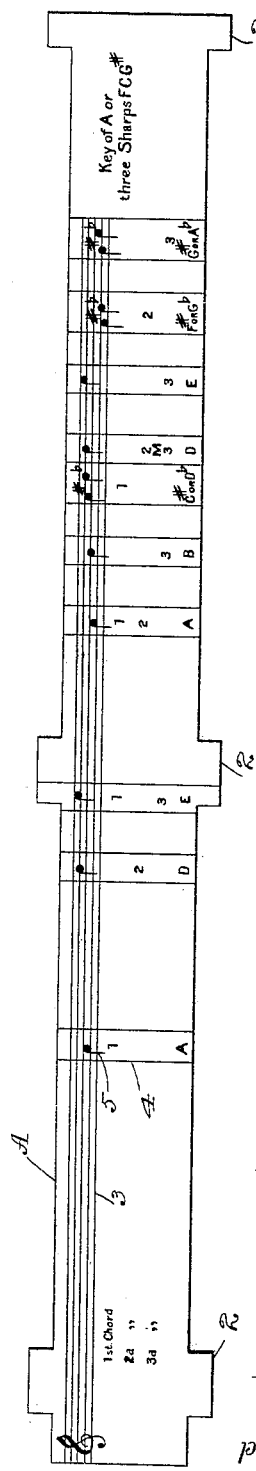
Witnesses:—
C. L. Caldwell
A. Max Welch
Inventor:—
Harry S. Sutton,
per Paul Murrin
Attorneys.
THE NORRIS PETERS CO., PHOTO-LITHO., WASHINGTON, D. C.

UNITED STATES PATENT OFFICE.

HARRY S. SUTTON, OF ST. PAUL, MINNESOTA, ASSIGNOR OF ONE-HALF TO ANSEN N. HILGER, OF SAME PLACE.

MUSIC-CHART.

SPECIFICATION forming part of Letters Patent No. 479,902, dated August 2, 1892.

Application filed July 11, 1891. Serial No. 399,170. (No model.)

*To all whom it may concern:*

Be it known that I, HARRY S. SUTTON, of St. Paul, Ramsey county, Minnesota, have invented certain Improvements in Musical Charts, of which the following is a specification.

My invention relates to improvements in charts adapted to be placed upon the keyboard of a piano or similar instrument to serve as a guide to the pupil in playing the instrument, its object being to provide a chart for any desired musical key which will indicate to the pupil the keys of the instrument to be struck for each of the two major chords and for the minor chord of the musical key, presenting also to the eye in their respective relations to the keys of the instrument the several notes and the designating-letters of the notes.

To this end my invention consists in providing a piece of card-board or other similar material, preferably in length equal to two octaves of the instrument, having projections upon the edges adapted to fit between the black keys of the keyboard, so that it can be placed at the rear of the keyboard and held in an upright position. Transverse of the card-board are printed parallel vertical lines, the spaces between which stand immediately above the several keys of the keyboard. Lengthwise of the card-board are also printed the parallel lines of a music-bar, upon which are inscribed in proper position all the notes which go to make up the two major chords and the minor chord of the selected musical key. Beneath each of the notes which represent the first chord of the key and between the parallel lines is placed the numeral 1. Beneath each of the notes forming the second major chord is placed the numeral 2, and beneath each of the notes constituting the minor chord is placed the numeral 3. Beneath each of the notes on the bar is also placed its designating-letter, and adjacent to the notes and their designating-letters, which refer to the black keys of the instrument, are placed sharps or flats, as the case may be.

My invention further consists in the construction and combination hereinafter described, and particularly pointed out in the claims.

In the accompanying drawing, forming part of this specification, the figure represents a strip of card-board on which are printed the various designating-marks above described and certain other marks indicating the key for which the chart is arranged, and its several chords.

In the drawing, A represents the strip of card-board, in length sufficient to extend over two octaves of the ordinary keyboard and provided on its edges with projections 2 of any desired number, adapted to fit between the black keys of the keyboard, so as to hold the strip in a proper proper position relative thereto. Near the top and longitudinal of the strip is printed a music-bar 3, and running transversely of the strip, are the parallel vertical lines 4, the spaces between which stand immediately above the several keys of the keyboard. Musical notes 5 are placed between these parallel vertical lines in suitable position upon the bar with or without sharps or flats, as the case may be, to represent the several keys of the keyboard above which they are placed. The numerals 1 1, placed under the bar, indicate the notes belonging to the first major chord of the musical key, while the numerals 2 2 similarly represent the notes of the second major chord, and the numerals 3 3 the notes of the minor chord. Letters of the alphabet placed near the bottom of the card-board strip correspond to the notes above and the keys of the keyboard beneath, which are known by these respective letters, the notes and letters standing above the black keys being marked by sharps or flats, as the case may be. Each musical key is represented by a separate chart constructed in the manner described, and shown in the drawing, which illustrates the arrangement for the key of A.

In use the card-board strip is set on edge at the rear of the keyboard with the projections 2 fitting into the spaces between the black keys. To play the first chord, as indicated on the chart, the pupil places the thumb of the left hand upon the key beneath the first numeral 1 and strikes the octave with the little finger of the same hand. The other keys indicated by the numeral 1 are then struck by the fingers of the right hand.

These together constitute the first major chord. Similarly the keys of the second major chord, indicated by the numeral 2, and the minor chord, indicated by the numeral 3, are sounded. The chart shows clearly to the eye at a glance the appearance on the music-bar of the notes making up the chords, their respective designating-letters of the alphabet, and by the relative position of the notes and letters indicates the corresponding keys of the instrument.

I claim—

1. In a music-chart, a card-board formed to fit on edge on the keyboard of an instrument, having a music-bar and transverse vertical lines inscribed thereon, the spaces between the vertical lines standing immediately above the keys of the board beneath, musical notes comprising the several chords of a musical key inscribed upon the music-bar between the vertical lines and their corresponding letters of the alphabet, and designating-numerals for different chords inscribed within the spaces beneath the notes, substantially as and for the purposes set forth.

2. In a music-chart, the card-board having projections upon its edges to fit between the black keys of a keyboard, a music-bar inscribed longitudinally thereon, musical notes inscribed upon said bar comprising the chords of a selected musical key, and series of designating-numerals for the notes belonging to different chords of the key, substantially as and for the purposes set forth.

3. In a music-chart, the card-board adapted to be placed upon the keyboard of the instrument, a music-bar inscribed thereon, notes upon said bar, and letters of the alphabet upon said card, indicating all the keys of the keyboard which are required to be struck to sound all the chords of a selected musical key, and designating-numerals upon said card indicating the keys of the instrument to be struck to sound the different chords of the musical key, substantially as and for the purposes set forth.

4. As an improved article of manufacture, a board adapted to be fitted upon the keyboard of a musical instrument and having imprinted thereon in proper relation to the keys of the keyboard the notes of a musical chord arranged upon a music-bar and their designating-letters of the alphabet, substantially as and for the purposes set forth.

In testimony whereof I have hereunto set my hand this 7th day of July, 1891.

HARRY S. SUTTON.

In presence of—
T. D. MERWIN,
A. MAE WELCH.